G. A. UNTERBERG.
APPARATUS FOR THE MAGNETIC IGNITION IN EXPLOSION MOTORS.
APPLICATION FILED JAN. 31, 1906.
909,483.
Patented Jan. 12, 1909.
2 SHEETS—SHEET 1.
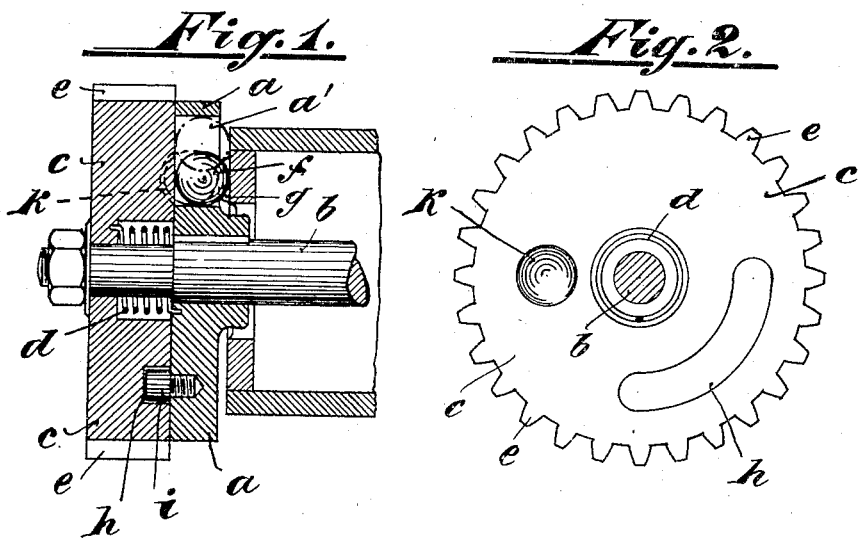
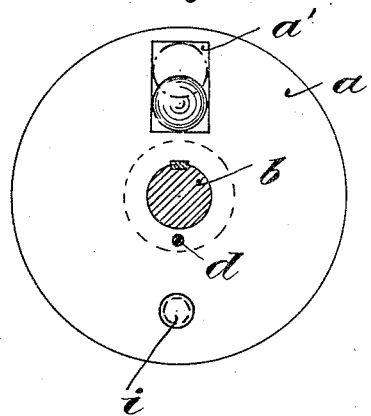
Witnesses:
Inventor:
Gustav Adolf Unterberg
by Eustace W. Hopkins
Attorney

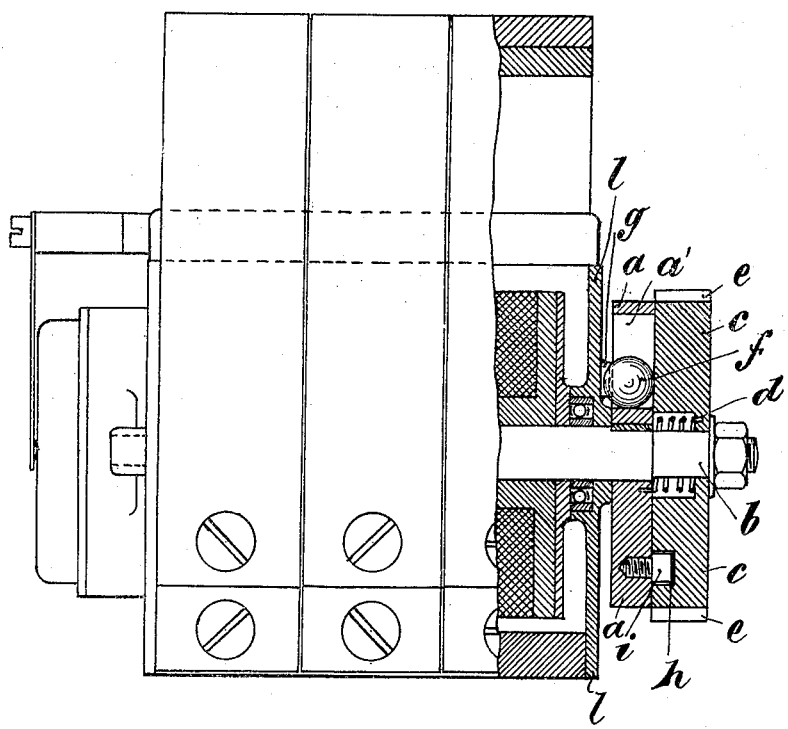

UNITED STATES PATENT OFFICE.

GUSTAV ADOLF UNTERBERG, OF KARLSRUHE-MÜHLBERG, GERMANY.

APPARATUS FOR THE MAGNETIC IGNITION IN EXPLOSION-MOTORS.

No. 909,483.　　　　Specification of Letters Patent.　　Patented Jan. 12, 1909.

Application filed January 31, 1906. Serial No. 298,818.

*To all whom it may concern:*

Be it known that I, GUSTAV ADOLF UNTERBERG, a citizen of the German Empire, residing at No. 46 Bachstrasse, Karlsruhe-Mühlberg, Baden, Germany, have invented a new and useful Improved Apparatus for the Magnetic Ignition in Explosion-Motors, of which the following is a description.

The present invention relates to apparatus for producing magnetic ignition in explosion motors and especially to those apparatuses in which, when the motor is running slowly, the armature-shaft is temporarily arrested, for the purpose of being jerked forwards at the moment of ignition, by the action of a spring, which has been stretched in the meantime, thus producing a spark, sufficiently strong to ignite the explosive-mixture.

The main feature of the present device in view of older similar devices is that the stop is formed by a ball loosely mounted in a slot of one of the members so that friction is entirely avoided.

The invention is hereafter described with reference to the accompanying drawing, in which—

Figure 1 is a longitudinal section, while Figs. 2 and 3 are views of the respective coupling parts and Fig. 4 shows the whole apparatus partly in section.

The coupling member $a$ is keyed to the armature-shaft $b$, the coupling member $c$ being loosely mounted on this shaft. The two coupling-members are connected by the torsional spring $d$. The coupling member $c$ is provided with a toothed rim $e$, by means of which it may be driven from any suitable source. In the coupling member $a$ a slot $a^1$ is provided, in which a ball $f$ is arranged. On rotation being imparted to the coupling members $a$ and $c$, the ball $f$ strikes the stop $g$ and thus arrests the coupling member $a$ against further rotation thus stretching the spring $d$. The relative movement of the two coupling members $a$ and $c$ against each other is limited by the pin $i$, engaging the slot $h$ of the coupling member $c$. At a suitable part of the coupling member $c$ there is provided a cavity $k$, which on the relative movement of the two parts $a$ and $c$ against each other finally registers with the ball $f$ (Fig. 1 in dotted lines) and allows the said ball to pass the stop $g$.

The device operates in the following manner:—When the motor is running slowly, for instance, on starting, the ball $f$ is in its initial position, and on the rotation of the coupling member $a$ strikes against the stop $g$ and arrests the coupling part $a$ against further rotation, until the cavity $k$ of the latter registers with the said ball $f$. The latter enters the said cavity $k$ (Fig. 1 in dotted lines) and thus comes out of contact with the stop $g$, so that the coupling member $a$ and with it the armature-shaft of the apparatus is jerked forwards by the action of the torsional spring, its movement being limited by the slot $h$ and the pin $i$. This accelerated movement of the armature is used for producing the spark for the ignition. As soon as the speed of the motor increases the temporary acceleration will become superfluous and the ball $f$ flies outwards, owing to the centrifugal power, into the position shown in dotted lines, and is thus out of the reach of the stop $g$. Then the coupling $a$, $c$ works like a fast connection.

I claim as my invention:—

1. In a device for operating magnetic igniting apparatus for explosion motors the combination of two coupling members, an armature shaft on which the said coupling members are arranged, the one being fast and the other loose thereon, a spring, connecting the said coupling members, means for driving the loose coupling member, a slot in the fast coupling member, a ball loosely mounted in the said slot, a stop against which the said ball strikes, said ball being adapted to be moved out of reach of the said stop by centrifugal force, a slot in the loose coupling part, a pin, mounted on the fast coupling part and engaging said slot for limiting the rotation of the two coupling parts against each other, and a cavity in the loose coupling part, into which the said ball may enter, to pass the said stop, substantially as described.

2. In a device for operating magnetic igniting apparatus for explosion motors the combination of the coupling members $a$ and $c$, an armature shaft $b$, upon which the said member $a$ is fixed and the said member $c$ is loosely mounted, a spring $d$, connecting the two members $a$ and $c$, circumferential tooth gearing $e$ on the said member $c$, for transferring motion to the same, a ball $f$, a slot $a^1$ in which the said ball is loosely mounted, a stop $g$, against which the said ball may strike, thus temporarily arresting the part $a$ against further rotation, said ball being adapted to be moved out of reach of the said stop by centrifugal force, a slot in the member $c$, a pin $i$, engaging the said slot and limiting the relative rotation of the said coupling members $a$ and $c$ against each other, and a cavity $k$ in the said part $c$, substantially as described.

3. In a device for operating magnetic igniting apparatus for explosion motors the combination of the armature shaft $b$, a coupling member $a$, rigidly mounted on the said armature shaft, and a coupling member $c$ loosely mounted thereon, a slot $a'$ in the said member $a$, a ball $f$, loosely mounted in the said slot, and a stop $g$ for the ball to temporarily arrest the said part $a$ against rotation, said ball being adapted to be moved out of reach of the said stop by centrifugal force, substantially as described.

In testimony whereof I affix my signature in the presence of two witnesses.

GUSTAV ADOLF UNTERBERG.

Witnesses:
 THUR HUNCEBERG,
 H. W. HARRIS.